United States Patent
Larsson et al.

(10) Patent No.: US 8,472,367 B2
(45) Date of Patent: Jun. 25, 2013

(54) ENHANCING OUTAGE CAPACITY BASED ON ADAPTIVE MODE SWITCHING BETWEEN ON-FREQUENCY AND FREQUENCY TRANSLATION

(75) Inventors: Peter Larsson, Solna (SE); Robert Baldemair, Solna (SE); Pål Frenger, Linköping (SE); Niklas Johansson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 230 days.

(21) Appl. No.: 13/128,806

(22) PCT Filed: Nov. 12, 2008

(86) PCT No.: PCT/SE2008/051300
§ 371 (c)(1),
(2), (4) Date: May 11, 2011

(87) PCT Pub. No.: WO2010/056162
PCT Pub. Date: May 20, 2010

(65) Prior Publication Data
US 2011/0217921 A1 Sep. 8, 2011

(51) Int. Cl.
*H04B 7/14* (2006.01)
(52) U.S. Cl.
USPC ........................................................ 370/315
(58) Field of Classification Search
None
See application file for complete search history.

(56) References Cited

U.S. PATENT DOCUMENTS

| | | | |
|---|---|---|---|
| 2004/0097189 A1* | 5/2004 | Bongfeldt et al. | 455/7 |
| 2010/0272005 A1* | 10/2010 | Larsson et al. | 370/315 |
| 2010/0279602 A1* | 11/2010 | Larsson et al. | 455/7 |
| 2011/0014911 A1* | 1/2011 | Baldemair et al. | 455/434 |
| 2011/0064006 A1* | 3/2011 | Gan et al. | 370/279 |
| 2011/0081856 A1* | 4/2011 | Johansson et al. | 455/7 |
| 2011/0154145 A1* | 6/2011 | Lomnitz | 714/749 |
| 2011/0164661 A1* | 7/2011 | Frenger et al. | 375/211 |

FOREIGN PATENT DOCUMENTS

| | | |
|---|---|---|
| WO | 02/052753 A1 | 7/2002 |
| WO | 2005/064872 A1 | 7/2005 |

OTHER PUBLICATIONS

Zhang, X. et al. "Perfomance Anlaysis of Multiuser Diversity in MIMO Systems with Antenna Selection." IEEE Transactions on Wireless Communications, vol. 7, No. 1, Jan. 2008.

\* cited by examiner

*Primary Examiner* — Otis L Thompson, Jr.
(74) *Attorney, Agent, or Firm* — Coats & Bennett, P.L.L.C.

(57) ABSTRACT

A method includes determining channel quality feedback information characterizing the channels statistically and calculating, based on the channel quality feedback information, a robustness related measure, such as outage capacity, associated with an on-frequency mode of operation and a robustness related measure, such as an outage capacity, associated with a frequency translated mode of operation. The method includes selecting the on-frequency mode of operation or the frequency translated mode of operation that maximizes the robustness related measure, such as outage capacity. The method also includes transmitting a message to other devices to operate in the selected on-frequency or a frequency translated modes. The method also includes performing maximum ratio combining or interference rejection combining, by at least one of the other devices, when the message indicates to operate in the frequency translated mode.

20 Claims, 15 Drawing Sheets

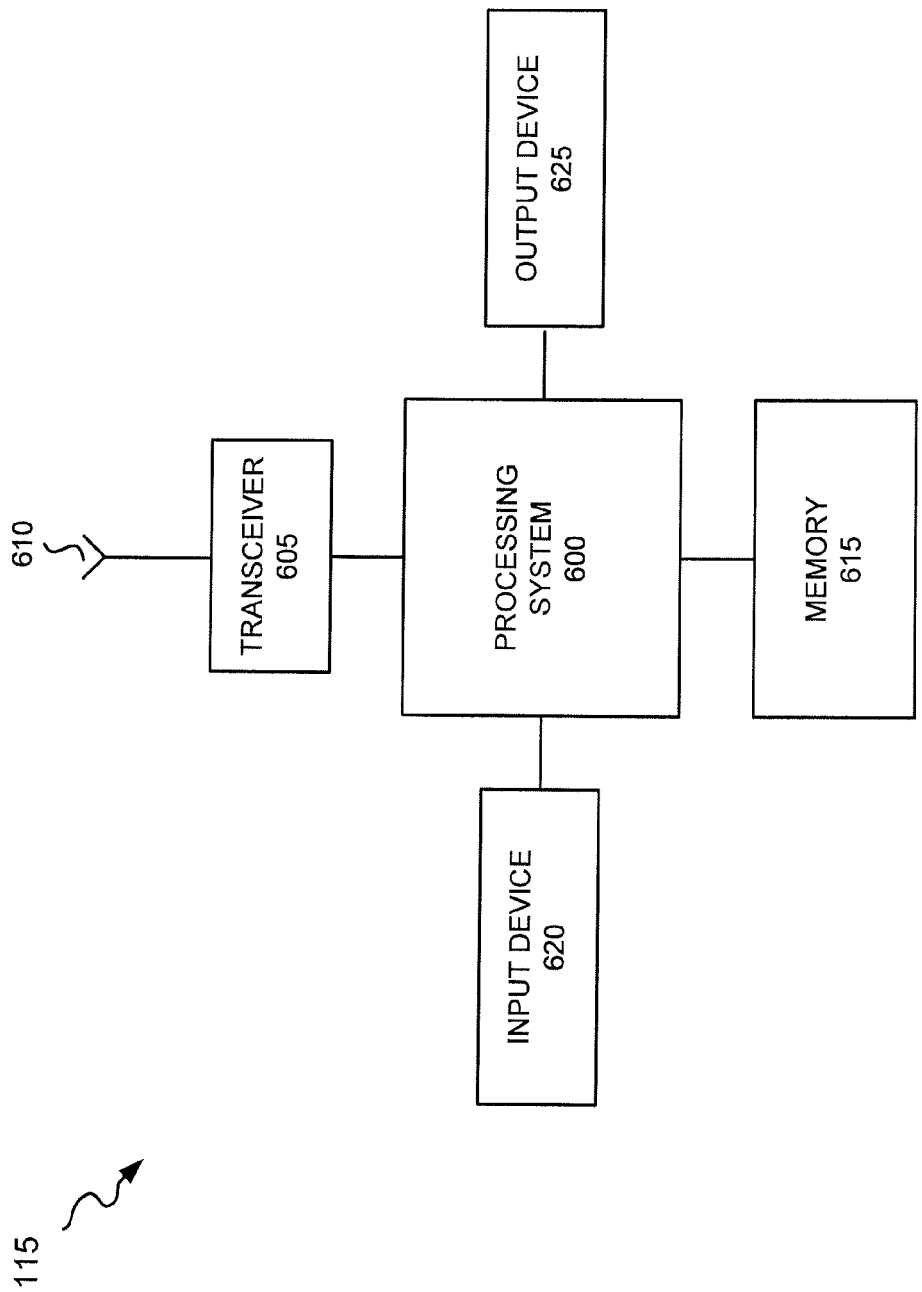

ENHANCING OUTAGE CAPACITY BASED ON ADAPTIVE MODE SWITCHING BETWEEN ON-FREQUENCY AND FREQUENCY TRANSLATION

TECHNICAL FIELD

Implementations described herein relate generally to communication systems. More particularly, implementations described herein relate to a scheme for enhancing outage capacity in communication systems.

BACKGROUND

In a communication system, such as a wireless communication system, devices may communicate with one another via an intermediary device. For example, a wireless station and user equipment (UE) may communicate via a repeater. Repeaters may be divided into two types, namely, on-frequency repeaters (OFRs) and frequency translating repeaters (FTRs). An OFR transmits a repeated signal on the same frequency, while a FTR transmits a repeated signal on a different frequency relative to the frequency used when receiving. Thus, OFRs utilize only one frequency resource while FTRs utilize two frequency resources and, as such, lose fifty-percent of those frequency resources. In this regard, the loss of such resources has a negative impact on the data rate or throughput.

A model to evaluate performance and wireless system design is the concept of outage probability. Outage probability is a measure that, in contrast to ergodic capacity, indicates a level of robustness of a wireless link and is defined as $Pr\{C \leq C_o\} = \epsilon$ (i.e., the outage capacity $C_o$ that the instantaneous capacity C exceeds with a probability of $1-\epsilon$). Outage capacity is typically associated with slow fading channels where the channel remains constant over a number of transmissions. In this regard, outage capacity is concerned with maintaining a constant rate during non-outage periods. In contrast, ergodic capacity is typically associated with fast fading channels where one transmission spans a number of coherence periods and equates to the ensemble average of the information rate. Existing techniques to enhance the outage capacity generally rely on a diversity method (e.g., interleaving, frequency hopping, transmit diversity, or macrodiversity).

Existing repeaters are not designed to reduce the outage capacity experienced by a receiving station. In particular, existing repeaters do not adopt low complexity adaptive schemes that allow for outage capacity optimization and account for different signal strength levels from a repeater, as well as direct path levels from a transmitter. In other words, existing repeaters are not specifically designed to reduce the outage capacity experienced by a receiving station.

WO 2005/064871 A1 relates to relay supported wireless communication to enhance communication performance by using cooperative relaying.

SUMMARY

It is an object to obviate at least some of the above disadvantages and to improve the operability of devices within a communication system.

According to one aspect, a method may be performed by a device in a wireless network. The method may include receiving channel quality feedback information, calculating, based on the channel quality feedback information, an outage capacity associated with an on-frequency mode of operation and an outage capacity associated with a frequency-translated mode of operation, selecting the on-frequency mode of operation or the frequency-translated mode of operation that maximizes outage capacity based on the calculated outage capacities associated with the on-frequency and frequency translated modes of operation, and transmitting, to two or more other devices, a message indicating to operate in an on-frequency mode or a frequency-translated mode based on the selected on-frequency mode of operation or the frequency-translated mode of operation.

According to another aspect, a method may be performed by a device in a wireless network. The method may include transmitting, to another device, channel quality feedback information, receiving, from the other device, a message indicating to operate in an on-frequency mode or a frequency-translated mode, based on the transmitted channel quality feedback information, and operating, by the device, in the on-frequency mode or the frequency translated mode according to the message.

According to yet another aspect, a device in a wireless network may include one or more antennas and a processing system. The processing system may be configured to determine channel quality information, maximize an outage capacity by selecting an on-frequency mode of operation or a frequency translated mode of operation based on the channel quality information, and transmit, to two or more other devices, a message indicating to operate in an on-frequency mode or a frequency translated mode.

According to still another aspect, a computer-readable medium may include instructions to receive channel quality information, calculate, based on the channel quality information, an outage capacity associated with an on-frequency mode of operation and an outage capacity associated with a frequency translated mode of operation, and determine which of the outage capacities associated with the on-frequency mode of operation and the frequency translated mode of operation maximizes outage capacity.

According to yet another aspect, a system may comprise a base station to receive channel quality information that includes statistical measurements of a channel, calculate, based on the channel quality information, an outage capacity associated with an on-frequency mode of operation and an outage capacity associated with a frequency-translated mode of operation, selecting the on-frequency mode of operation or the frequency-translated mode of operation that maximizes outage capacity, and transmit a message indicating a selection of the on-frequency mode of operation or the frequency-translated mode of operation to other devices in a wireless network, and the other devices adhere to the mode of operation indicated in the message.

BRIEF DESCRIPTION OF THE DRAWINGS

FIGS. 6A and 6B are diagrams illustrating exemplary components of the UE depicted in FIG. 1B;

DETAILED DESCRIPTION

The following detailed description refers to the accompanying drawings. The same reference numbers in different drawings may identify the same or similar elements. Also, the following description does not limit the invention.

The concepts described herein relate to a communication system. The communication system is intended to be broadly interpreted to include any type of wireless network, such as a cellular network and/or a mobile network (e.g., Global System for Mobile Communications (GSM), Long Term Evolution (LTE), Wideband Code Division Multiple Access (WCDMA), Ultra Mobile Broadband (UMB), Universal Mobile Telecommunications Systems (UMTS), Code Division Multiple Access 2000 (CDMA2000), ad hoc networks, High-Speed Packet Access (HSPA), etc.), and a non-cellular network (e.g., Wireless Fidelity (Wi-Fi), Worldwide Interoperability for Microwave Access (WiMax), etc.). In this regard, it will be appreciated that the concepts described herein are not platform dependent and may be implemented within a wide variety of communication systems.

The communication system may include a network in which one or multiple intermediate devices (e.g., a repeater, a relay, etc.) may be employed. The terms communication system and network may be used interchangeably throughout this description.

Embodiments described herein may provide that a device of a communication system may signal other devices to adaptively switch between OFR and FTR modes. The adaptive switching between modes may be based on one or more criteria that yield the highest outage capacity. For example, the one or more criteria may include channel quality information (e.g., mean signal-to-noise ratio (SNR)). Additionally, the device may make other types of communication-related decisions (e.g., which frequency band(s) to utilize, power levels, selection of intermediate devices, etc.). From the perspective of other devices that are in communication with the device, embodiments described herein may provide that these other devices may adaptively switch between OFR and FTR modes based on OFR/FTR mode signal (e.g., a message). Further, the other devices may perform maximum ratio combining (MRC) or interference rejection combining (IRC) when in FTR mode. Additionally, or alternatively, the other devices may provide channel quality information associated with each mode to the device.

Figure 1A:
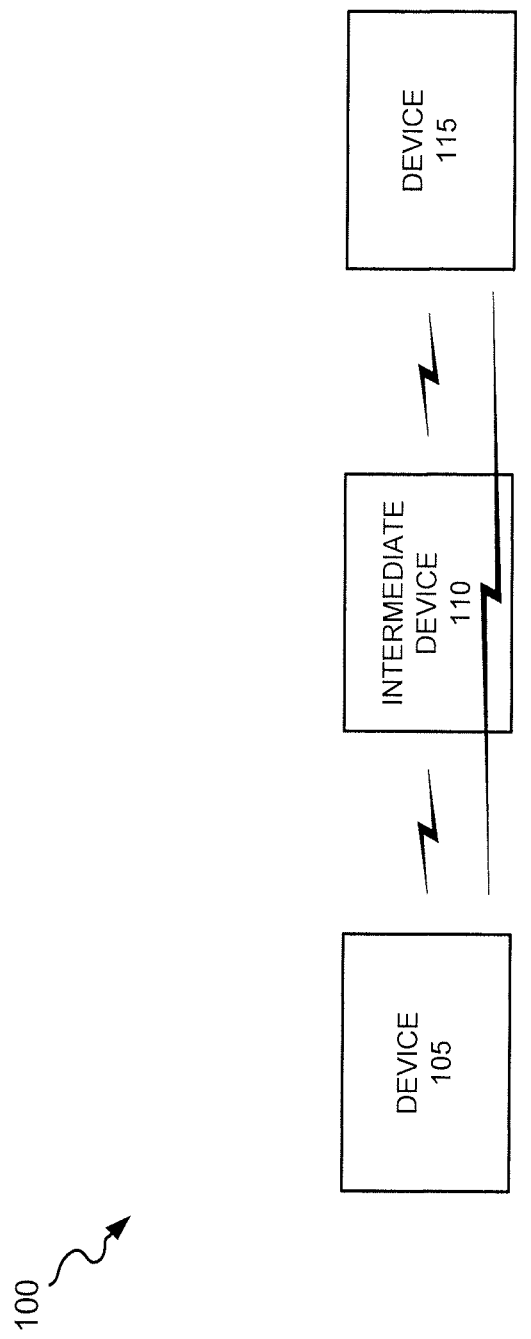
FIGS. 1A and 1B are diagrams illustrating devices communicating with one another via an intermediate device.

FIG. 1A is a diagram illustrating an exemplary communication system 100 in which the concepts described herein may be implemented. As illustrated, communication system 100 may include a device 105, an intermediate device 110, and a device 115. A device (i.e., device 105, intermediate device 110, and/or device 115) may include, for example, a UE, a gateway, a base station, a base station controller, a switch, a relay, a repeater, a bridge, a router, any combination thereof, and/or another type of device (e.g., a satellite). The device may operate at layer 1, layer 2, and/or at a higher layer of a protocol stack. As illustrated in FIG. 1A, the devices may be communicatively coupled. For example, the devices may be communicatively coupled via wireless communication links (e.g., radio, microwave, etc.). The number of devices illustrated in communication system 100 is exemplary, and in other instances, may be different.

Figure 1B:
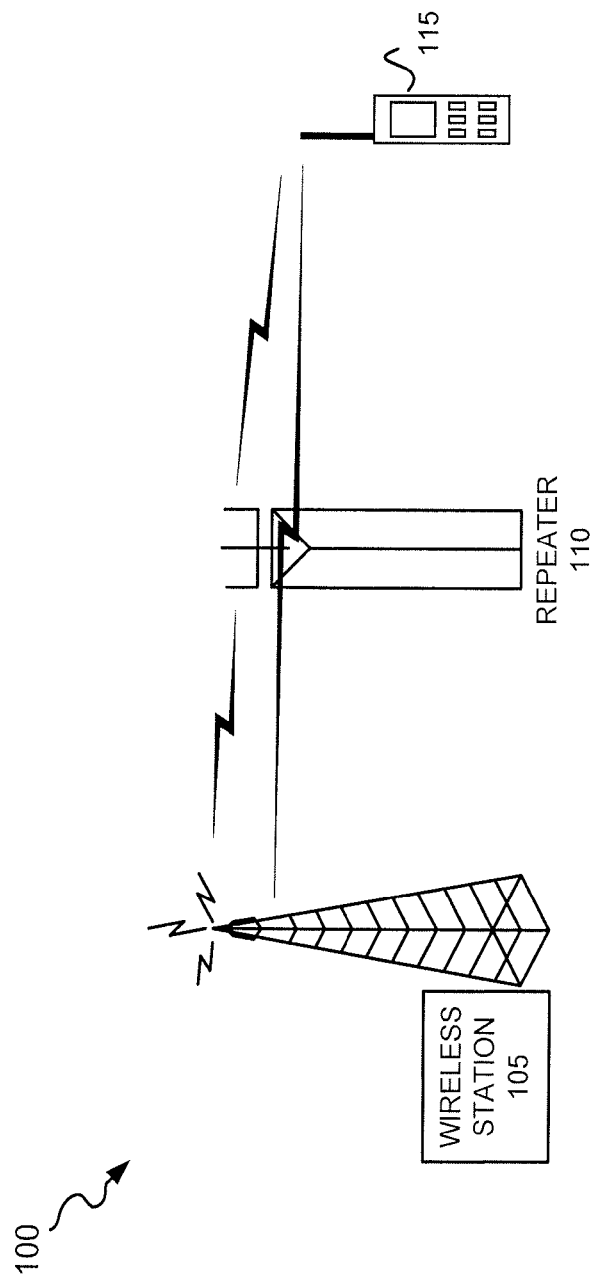

Since the concepts described herein are applicable to a variety of devices in communication system 100, communication system 100 will be described based on the exemplary devices illustrated in FIG. 1B. FIG. 1B illustrates an exemplary implementation in which device 105 includes a wireless station, intermediate device 110 includes a repeater, and device 115 includes a user equipment (UE). Wireless station 105, repeater 110 and UE 115 may be communicatively coupled.

Wireless station 105 may include a device having communication capability. The term wireless station is intended to be broadly interpreted to include, for example, a device that may communicate with UE 115 via repeater 110. For example, a wireless station may include a base station (BS), a base station transceiver (BTS) (e.g., in a GSM communication system), an eNodeB (e.g., in a LTE communication system), a Node B (e.g., in a UMTS communication system), or some other type of device. As will be described in detail below, wireless station 105 may select, based on channel quality information, an OFR mode or an FTR mode for repeater 110 and UE 115 to operate. Wireless station 105 may signal repeater 110 and UE 115 indicating the mode of operation based on its selection.

Repeater 110 may include a device having communication capability. Repeater 110 may be capable of switching between and operating in an OFR mode and an FTR mode.

UE 115 may include a device having communication capability. For example, UE 115 may include a telephone, a computer, a personal digital assistant (PDA), a gaming device, a music playing device, a video playing device, a web browser, a personal communication system (PCS) terminal, a pervasive computing device, and/or some other type of device. UE 115 may be capable of switching between and operating in an OFR mode and a FTR mode.

Although FIG. 1B is described as wireless station 105 and UE 115 having particular functionalities associated with the concepts described herein, in other implementations, wireless station 105 and UE 115 may be capable of performing functions that have been described as being performed by UE 115 and wireless station 105. For example, UE 115 may select, based on channel quality information, an OFR mode or an FTR mode for wireless station 105 to operate, etc.

Figure 2A:
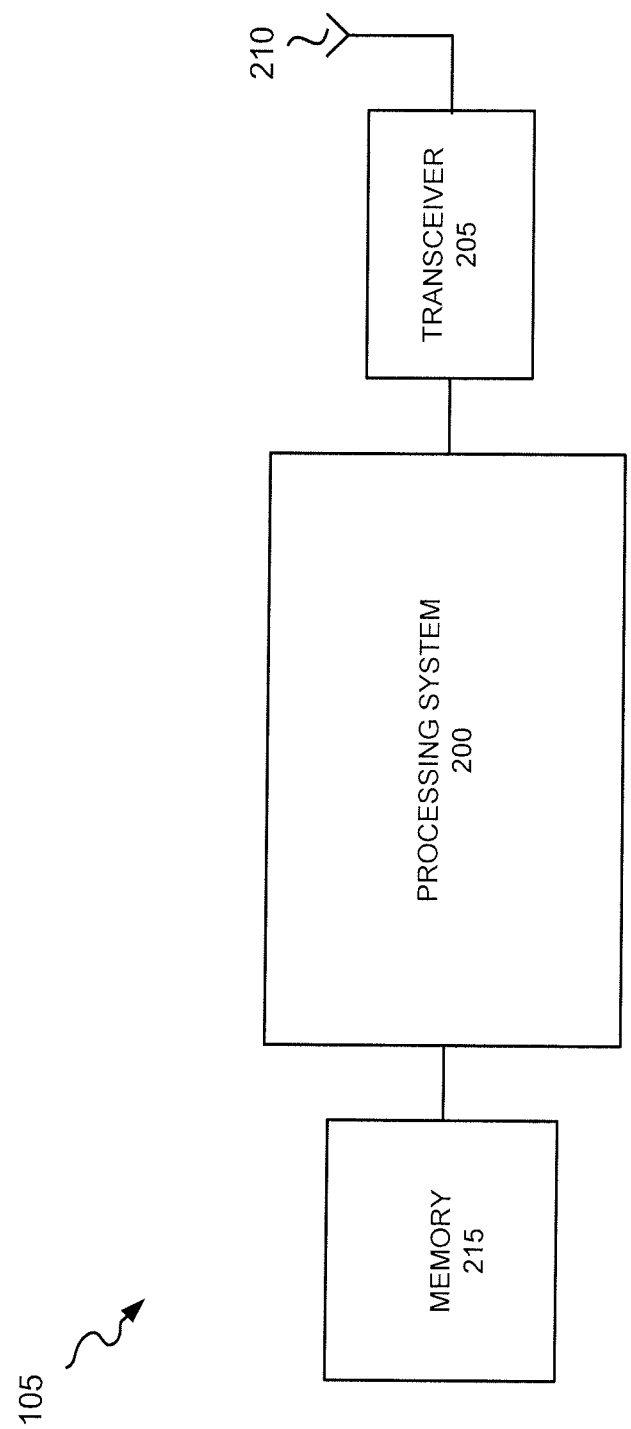
FIGS. 2A and 2B are diagrams illustrating exemplary components of the wireless station depicted in FIG. 1B.

FIG. 2A is a diagram illustrating exemplary components of wireless station 105. The term component is intended to be broadly interpreted to include, for example, hardware, software and hardware, firmware, software, or some other type of component and/or combination of components. As illustrated, wireless station 105 may include a processing system 200, a transceiver 205, an antenna 210, and a memory 215.

Processing system 200 may include a component capable of interpreting and/or executing instructions. For example, processing system 200 may include, a general-purpose processor, a microprocessor, a data processor, a co-processor, a network processor, an application specific integrated circuit (ASIC), a controller, a programmable logic device, a chipset, and/or a field programmable gate array (FPGA). Processing system 200 may control one or more other components of wireless station 105. Processing system 200 may be capable of performing various communication-related processing (e.g., signal processing, channel estimation, beamforming, power control, scheduling, etc.).

Transceiver 205 may include a component capable of transmitting and/or receiving information over wireless channels via antennas 210. For example, transceiver 205 may include a transmitter and a receiver. Transceiver 205 may be capable of performing various communication-related processing (e.g., demodulation/modulation, deinterleaving/interleaving, equalizing, filtering, decoding/coding, signal measurement, etc.). Antenna 210 may include a component capable of receiving information and transmitting information via wireless channels. Antenna 210 may include a single or a multi-antenna system (e.g., a MIMO antenna system). Antenna 210 may provide one or more forms of diversity (e.g., spatial, pattern, or polarization).

Memory 215 may include a component capable of storing information (e.g., data and/or instructions). For example, memory 215 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Although FIG. 2A illustrates exemplary components of wireless station 105, in other implementations, wireless station 105 may include fewer, additional, and/or different components than those depicted in FIG. 2A. It will be appreciated that one or more components of wireless station 105 may be capable of performing one or more other tasks associated with one or more other components of wireless station 105.

Figure 2B:
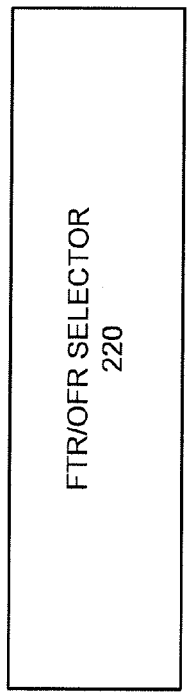
Figure 2B:

FIG. 2B is a diagram illustrating an exemplary functional component capable of performing one or more operations associated with the concepts described herein. In one embodiment, this exemplary functional component may be implemented in processing system 200 of wireless station 105. However, it will be appreciated that the functional component may be implemented in connection with, for example, other components (e.g., transceiver 205) of wireless station 105, in combination with two or more components (e.g., processing system 200, transceiver 205, memory 215) of wireless station 105, and/or as an additional component(s) to those previously described in FIG. 2A.

As illustrated in FIG. 2B, wireless station 105 may include an FTR/OFR selector 220. FTR/OFR selector 220 may select an FTR mode or an OFR mode for repeater 110 and UE 115 to operate based on one or more criteria that, for example, yield the highest outage capacity, as described herein. FTR/OFR selector 220 may generate an FTR/OFR mode signal that indicates the selected mode. The FTR/OFR mode signal may also include information (e.g., information related to frequency selection, power, etc.). Wireless station 105 may transmit the FTR/OFR mode signal to repeater 110 and UE 115.

For frequency flat channels (e.g., channels having substantially the same magnitude in frequency(s)) or channels having substantially the same channel qualities (e.g., a set of Orthogonal Frequency Division Multiplexing (OFDM) sub-carriers), the maximum link performance may be expressed by the Shannon capacity. Therefore, the instantaneous rate in the FTR mode may be expressed in the following manner:

$$R_{FTR} = \frac{B}{2}\log_2(1 + \Gamma_1 + \Gamma_2), \quad (1)$$

where $\Gamma_1$ is the transmitter-to-receiver SNR (e.g., wireless station-to-UE SNR), and $\Gamma_2$ is the effective transmitter-to-repeater-to-receiver SNR (e.g., wireless station-to-repeater-to-UE SNR). B corresponds to the bandwidth. The addition of the SNRs is due to maximum ratio combining, and the ½-factor is due to the use of two frequency resources.

The instantaneous rate in the OFR mode may be expressed in the following manner:

$$R_{OFR} = B \log_2(1+\Gamma_3), \quad (2)$$

where $\Gamma_3$ is an aggregate SNR measure resulting from addition of both the transmitter-to-receiver and the transmitter-to-repeater-to-receiver signals.

With Rayleigh fading channels from the transmitter to the receiver and the repeater to the receiver, and while having a non-fading channel from the transmitter to the repeater, $\Gamma_1$ and $\Gamma_2$ may be considered exponentially distributed random variables (r.v.s.). Additionally, under the Rayleigh fading assumption, $\Gamma_3$ may also be considered an exponentially distributed random variable with the equivalent mean SNR of $E\{\Gamma_1+\Gamma_2\}$.

From expressions 1 and 2, it will be appreciated that expression (1) may offer lower variance due to the sum of two exponentially distributed r.v.s. than expression (2). However, expression (2) may offer a factor of two of higher use of frequency resources and/or a mean SNR that is increased.

The mode selection process may be expressed as:

$$\text{mode} = \arg\max_{FTR,OFR}\{C_{FTR}^\epsilon, C_{OFR}^\epsilon\} \quad (3)$$

where $C_{FTR}^\epsilon$ and $C_{OFR}^\epsilon$ is the $\epsilon$-outage capacity for FTR and OFR, respectively.

When Rayleigh fading is assumed, the outage capacities may be fully known from the means SNRs $\overline{\Gamma}_k$. Thus, expression (3) may be re-written in the following manner:

$$\text{mode} = \arg\max_{FTR,OFR}\{C_{FTR}^\epsilon(\overline{\Gamma}_1,\overline{\Gamma}_2), C_{OFR}^\epsilon(\overline{\Gamma}_3)\} \quad (4)$$

The mean SNRs $\overline{\Gamma}_k$ may be obtained from channel quality information. The channel quality information may be based on measurements from repeater 110, UE 115, and/or wireless station 105 in the downlink or uplink. For example, UE 115 may transmit channel quality information to wireless station 105. The channel quality information may include wireless station-to-UE channel quality information and wireless station-to-repeater-to-UE channel quality information. FTR/OFR selector 220 may utilize this channel quality information for determining which mode to adaptively utilize since the outage capacity is a function of the mean SNR.

It will be appreciated that although expressions (1) through (4) have been described based on the assumption of Rayleigh fading (i.e., where the channel's stochastic processes are assumed to be known), a different fading assumption may be employed. In this regard, the outage scheme may use other or additional statistical quality measurements of the channels, such as, for example, higher order statistical characterization of the channels (i.e., transmitter-to-receiver path, transmitter-to-repeater-to receiver path) in deciding whether to adaptively switch between FTR and OFR modes.

In addition to adaptively switching between FTR/OFR modes of operation, FTR/OFR selector 220 may also determine other operations to maximize the outage capacity. Alternatively, in other implementations, other components (e.g., processing system 200 and/or transceiver 205) of wireless station 105 may determine the other operations to maximize the outage capacity. For example, FTR/OFR selector 220 may select the power levels of transmission to use for wireless station 105 and/or repeater 110, select which repeater(s) to use when multiple repeaters 110 are available, select the frequency band(s) to use when in FTR mode, and/or select the frequency band(s) to use when in OFR mode. The term frequency band, as used herein, is intended to be broadly interpreted to include, for example, one or more sub-carriers, a frequency spectrum, one or more channels, or some other type of frequency-based segment or resource. For example, depending on the communication system, modulation scheme, communication platform, etc., the term frequency band may have a particular meaning. The selection of frequency bands when in FTR mode and/or OFR mode may include selection of frequency band(s) for wireless station 105, repeater 110, and/or UE 115.

Figure 3:
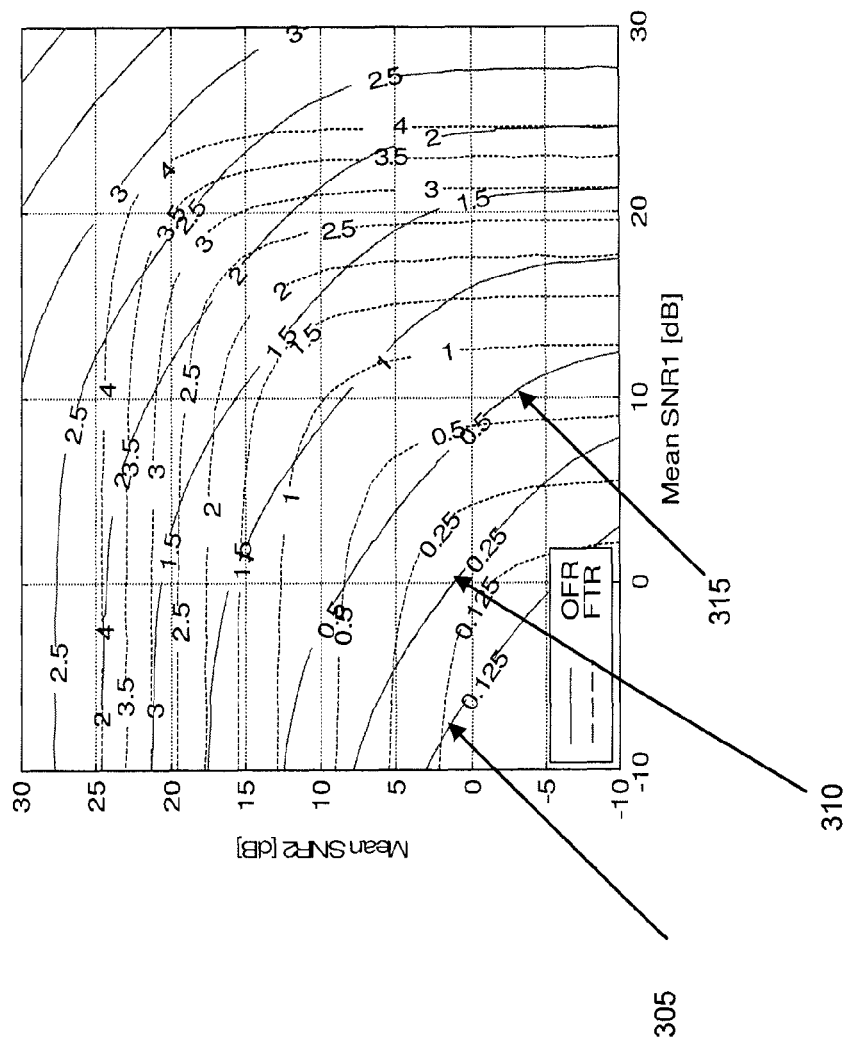
FIGS. 3 and 4 are diagrams illustrating contour plots with respect to OFR and FTR modes.
Figure 4:
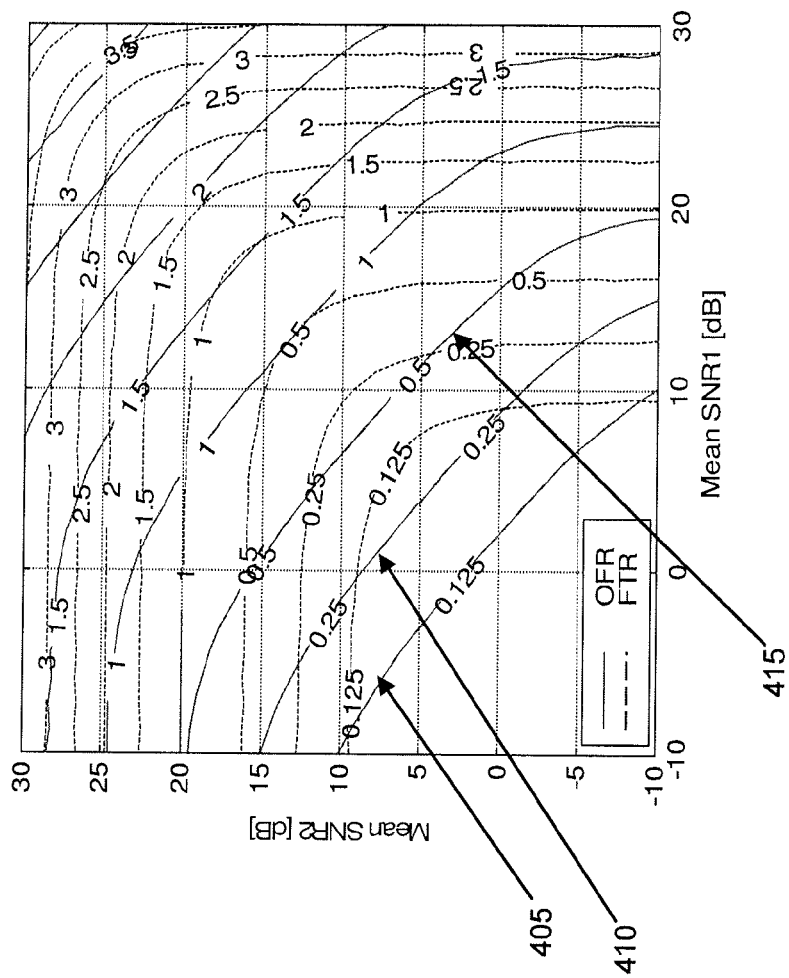

Under the Rayleigh fading assumption, FIG. 3 illustrates an exemplary contour plot that includes the transmitter-to-receiver mean SNR1 and the transmitter-to-repeater-to-receiver effective mean SNR2 of a five percent outage capacity in b/Hz/s for the OFR and the FTR modes, respectively. FIG. 3 further illustrates that different SNR regions are optimal for the OFR and the FTR modes, respectively. For example, FIG. 3 illustrates that the OFR mode is primarily optimal in the low SNR ranges, such as, for example, contours 305, 310 and 315. One can also see when there is a strong unbalance between the mean SNR 1 and the mean SNR 2, it successively improves the performance for FTR relative to OFR. FIG. 4 illustrates a similar contour plot where there is a one percent outage capacity in b/Hz/s for the OFR and the FTR modes, respectively. Again, FIG. 4 illustrates that different SNR regions are optimal for the OFR and the FTR modes, respectively. Similarly, FIG. 4 illustrates that OFR mode is primarily optimal in the low SNR ranges, such as, for example, contours 405, 410 and 415.

Figure 5A:
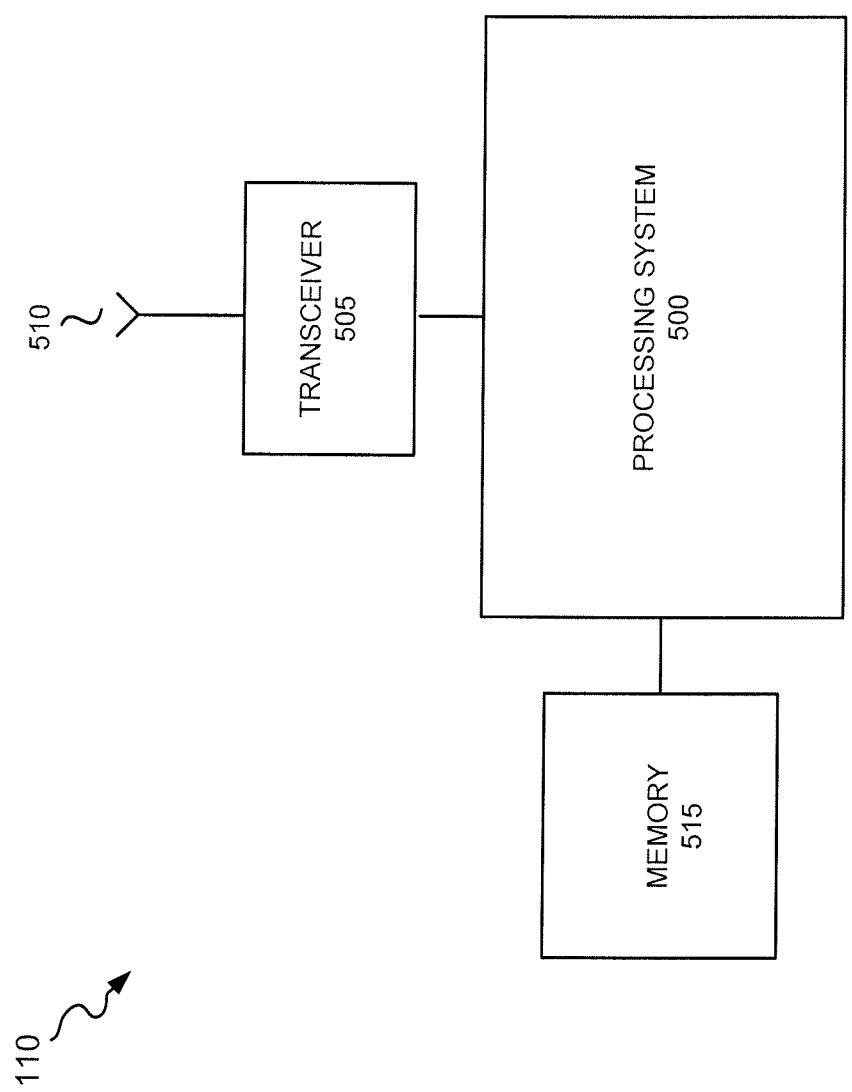
FIGS. 5A and 5B are diagrams illustrating exemplary components of the repeater depicted in FIG. 1B.

FIG. 5A is a diagram illustrating exemplary components of repeater 110. As illustrated, repeater 110 may include a processing system 500, a transceiver 505, an antenna 510, and a memory 515.

Processing system 500 may include a component capable of interpreting and/or executing instructions. For example, processing system 500 may include, a general-purpose processor, a microprocessor, a data processor, a co-processor, a network processor, an application specific integrated circuit (ASIC), a controller, a programmable logic device, a chipset, and/or a field programmable gate array (FPGA). Processing system 500 may control one or more other components of repeater 110. Processing system 500 may be capable of performing various communication-related processing (e.g., amplification, self-interference cancellation (SIC), frequency translation, etc.).

Transceiver 505 may include a component capable of transmitting and/or receiving information over wireless channels via antennas 510. Transceiver 505 may include a transmitter and a receiver. Transceiver 505 may be capable of performing various communication-related processing (e.g., filtering, decoding/coding, demodulation/modulation, etc.). Transceiver 505 may be capable of operating in FTR and OFR modes.

Antenna 510 may include a component capable of receiving information and transmitting information via wireless channels. Antenna 510 may include a single system or a multi-antenna system (e.g., a MIMO antenna system). Antenna 510 may provide one or more forms of diversity (e.g., spatial, pattern, or polarization).

Memory 515 may include a component capable of storing information (e.g., data and/or instructions). For example, memory 515 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Although FIG. 5A illustrates exemplary components of repeater 110, in other implementations, repeater 110 may include fewer, additional, and/or different components than those depicted in FIG. 5A. It will be appreciated that one or more components of repeater 110 may be capable of performing one or more other tasks associated with one or more other components of repeater 110.

Figure 5B:
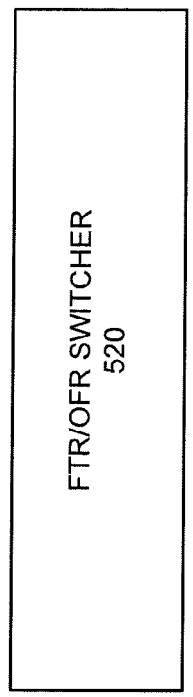
Figure 5B:
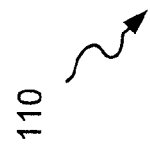

FIG. 5B is a diagram illustrating an exemplary functional component capable of performing one or more operations associated with the concepts described herein. In one embodiment this exemplary functional component may be implemented in processing system 500 of repeater 110. However, it will be appreciated that the functional component may be implemented in connection with, for example, other components (e.g., transceiver 505) of repeater 110, in combination with two or more components (e.g., processing system 500, transceiver 505, memory 515) of repeater 110, and/or as an additional component(s) to those previously described in FIG. 5A.

As illustrated in FIG. 5B, repeater 110 may include an FTR/OFR switcher 520. FTR/OFR switcher 520 may interpret an FTR/OFR mode signal. Repeater 110 (e.g., FTR/OFR switcher 520) may adaptively switch between and operate in FTR and OFR modes based on the FTR/OFR mode signal. Repeater 110 may also utilize other types of information (e.g., frequency selection information, power information, etc.) that may be included in the FRT/OFR mode signal.

FIG. 6A is a diagram illustrating exemplary components of UE 115. As illustrated, UE 205 may include a processing system 600, transceiver 605, antenna 610, a memory 615, an input device 620, and an output device 625.

Processing system 600 may include a component capable of interpreting and/or executing instructions. For example, processing system 600 may include a general-purpose processor, a microprocessor, a data processor, a co-processor, a network processor, an application specific integrated circuit (ASIC), a controller, a programmable logic device, a chipset, and/or a field programmable gate array (FPGA). Processing system 600 may control one or more other components of UE 115. Processing system 600 may be capable of performing various communication-related processing (e.g., signal processing, channel estimation, power control, timing control, etc.), as well as other operations associated with the operation and use of UE 115.

Transceiver 605 may include a component capable of transmitting and/or receiving information over wireless channels via antennas 610. Transceiver 605 may include a transmitter and a receiver. Transceiver 605 may include a single antenna system or a multi-antenna system (e.g., a MIMO system). Transceiver 605 may be capable of performing various communication-related processing (e.g., filtering, de/coding, de/modulation, signal measuring, etc.). Transceiver 605 may be capable of switching between and operating in FTR and OFR modes.

Antenna 610 may include a component capable of receiving information and transmitting information via wireless channels. In one implementation, antenna 610 may include a multi-antenna system (e.g., a MIMO antenna system). Antenna 610 may provide one or more forms of diversity (e.g., spatial, pattern, or polarization).

Memory 615 may include a component capable of storing information (e.g., data and/or instructions). For example, memory 615 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Input device 620 may include a component capable of receiving an input from a user and/or another device. For example, input device 620 may include a keyboard, a keypad, a touchpad, a mouse, a button, a switch, a microphone, a display, a port, and/or voice recognition logic.

Output device 625 may include a component capable of outputting information to a user and/or another device. For example, output device 625 may include a display, a speaker, one or more light emitting diodes (LEDs), a vibrator, a port, and/or some other type of visual, auditory, and/or tactile output device.

Although FIG. 6A illustrates exemplary components of UE 115, in other implementations, UE 115 may include fewer, additional, and/or different components than those depicted in FIG. 6A. For example, UE 115 may include a hard disk or some other type of computer-readable medium along with a corresponding drive. The term "computer-readable medium," as used herein, is intended to be broadly interpreted to include, for example, a physical or a logical storage device. It will be appreciated that one or more components of UE 115 may be capable of performing one or more other tasks associated with one or more other components of UE 115.

Figure 6B:
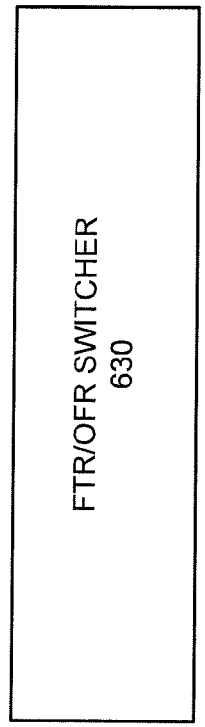
Figure 6B:

FIG. 6B is a diagram illustrating an exemplary functional component capable of performing one or more operations associated with the concepts described herein. In one embodiment this exemplary functional component may be implemented in processing system 600 of UE 115. However, it will be appreciated that the functional component may be implemented in connection with, for example, other components (e.g., transceiver 605) of UE 115, in combination with two or more components (e.g., processing system 600, transceiver 605, memory 615) of UE 115, and/or as an additional component(s) to those previously described in FIG. 6A.

As illustrated in FIG. 6B, UE 115 may include an FTR/OFR switcher 630. FTR/OFR switcher 620 may interpret an FTR/OFR mode signal. UE 115 (e.g., FTR/OFR switcher 620) may adaptively switch between and operate in FTR and OFR modes based on the FTR/OFR mode signal. UE 115 may also utilize other types of information (e.g., frequency selection information, power information, etc.) that may be included in the FRT/OFR mode signal. Additionally, UE 115 may perform maximum ratio combining (MRC) or interference rejection combining (IRC) when in FTR mode.

Figure 6C:
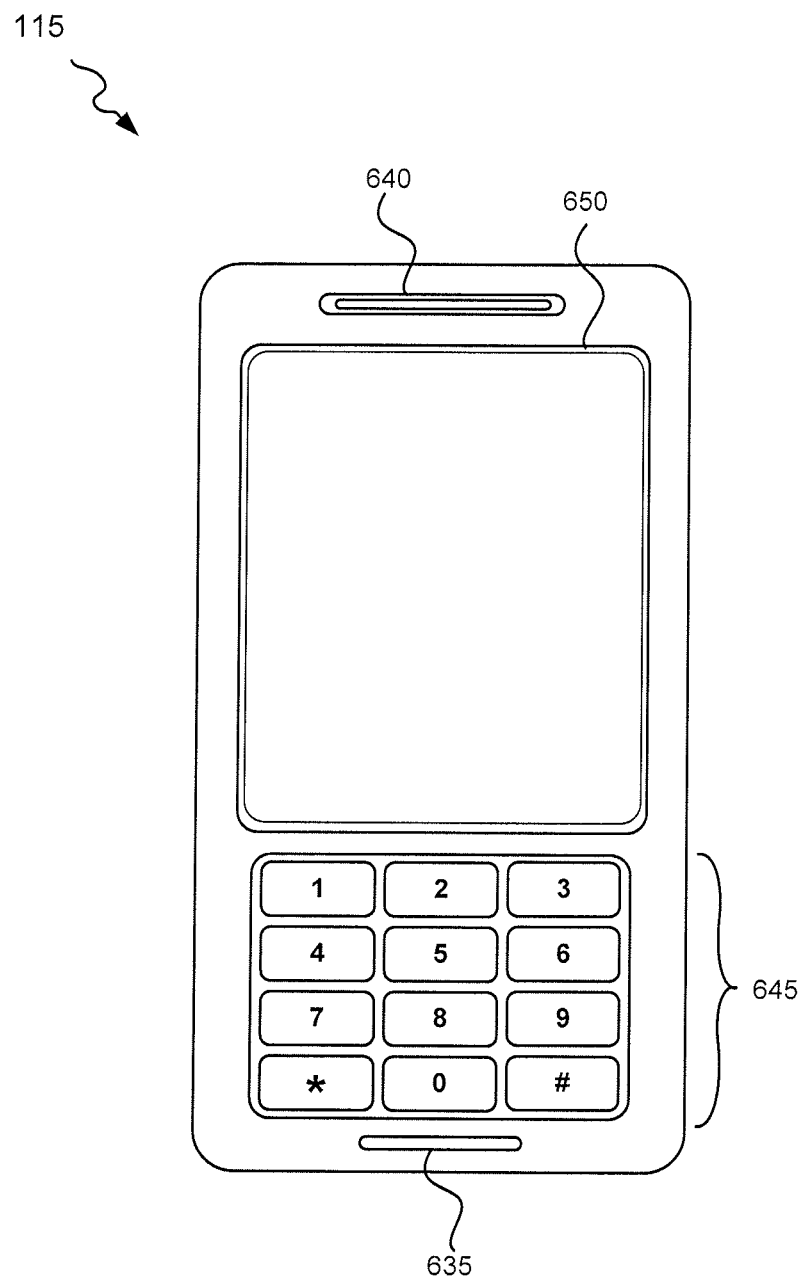
FIG. 6C is a diagram illustrating an exemplary implementation of the UE when the UE includes a wireless telephone.

FIG. 6C is a diagram illustrating an exemplary implementation of UE 115, where UE 115 includes a wireless telephone. As illustrated, UE 115 may include a microphone 635 (e.g., of input device 620) for entering audio information, a speaker 640 (e.g., of output device 625) for outputting audio information, a keypad 645 (e.g., of input device 620) for entering information or selecting functions, and a display 650 (e.g., of input device 620 and/or output device 625) for outputting visual information and/or inputting information, selecting functions, etc.

Although FIG. 6C illustrates an exemplary implementation of UE 115, in other implementations, UE 115 may include fewer, additional, or different exemplary components than those depicted in FIG. 6C.

An exemplary process is described below, in connection with FIG. 7, in which outage capacity is maximized. For purposes of discussion, the exemplary process will be described based on communication system 100 depicted in FIG. 1B. However, it will be appreciated that the exemplary process may be performed in communication system 100 depicted in FIG. 1A, in which devices different than those depicted in FIG. 1B may be present.

Figure 7:
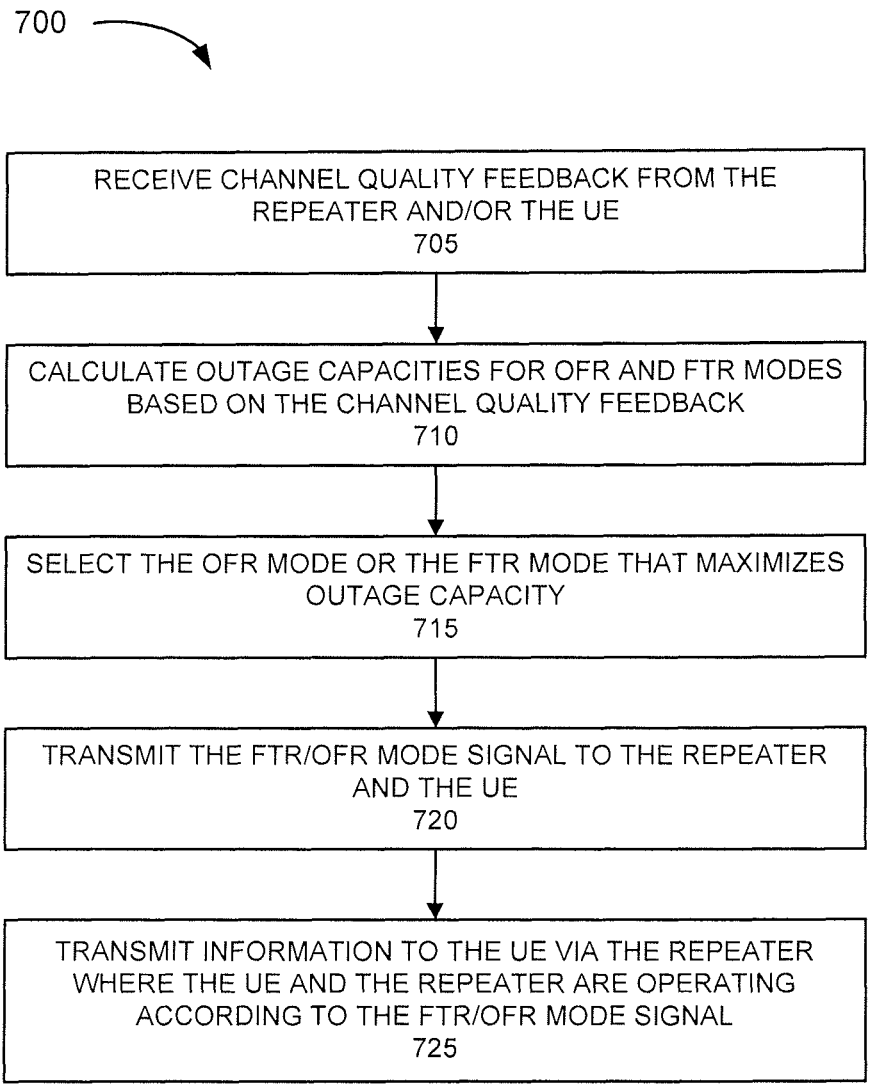
FIG. 7 is a flow diagram illustrating an exemplary process for maximizing outage capacity.

FIG. 7 is a flow diagram illustrating an exemplary process 700 for maximizing outage capacity. The exemplary process 700 may be performed by wireless station 105. It will be appreciated that although process 700 is being described as being performed by wireless station 105, in other implementations, process 700 may be performed by another device in environment 100, such as, for example, UE 115. Additionally, while process 700 will be described in reference to the downlink, wireless station 105 may control the adaptive switching between OFR/FTR modes for repeater 110 and UE 115 in the uplink or in both the uplink and the downlink directions. Similarly, when process 700 is performed by UE 115, UE 115 may control the adaptive switching between OFR/FTR modes for the downlink, the uplink, or both the downlink and uplink directions. In this regard, it will further be appreciated, that depending on the selected implementation, wireless station 105 and/or UE 115 may include the functional components FTR/OFR selector 220 and/or FTR/OFR switcher 630.

Figure 8:
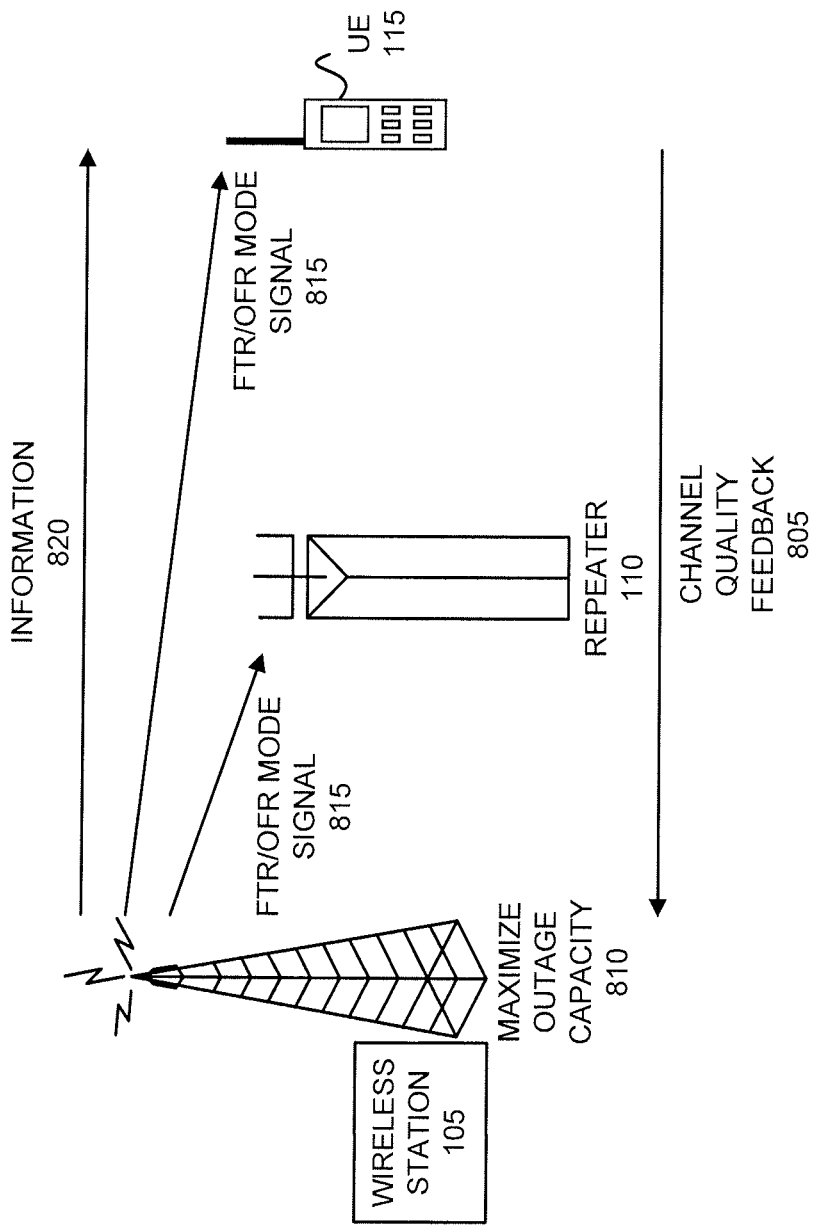
FIG. 8 is a diagram illustrating an exemplary scenario that is consistent with the exemplary process depicted in FIG. 7.

In addition to FIG. 7, process 700 will be described in connection with previous figures, as well as FIG. 8. FIG. 8 is a diagram illustrating an exemplary scenario that is consistent with process 700.

Process 700 may begin with receiving channel quality feedback from a repeater and/or a UE (block 705). For example, as illustrated in FIG. 8, repeater 110 and/or UE 115 may transmit channel quality feedback 805 to wireless station 105 based on a previous communication or based on channel estimations characterized from transmitted channel estimation symbols (also known as pilot symbols, or reference signals). Channel quality feedback 805 may include, for example, statistical measurements of the channel or other types of data indicative of the channel characteristics. The statistical measurements may include, for example, mean gain, mean gain-to-noise ratio, mean SNR, mean signal-to-interference-to-noise ratio (SINR), as previously described. Other types of data indicative of the channel characteristics may include, for example, higher order channel statistics (e.g., variance of the SNR, variance of the SINR, etc.). Additionally, or alternatively, wireless station 105 may measure and calculate channel quality feedback information.

Outage capacities for OFR and FTR modes may be calculated based on the channel quality feedback (block 710). As previously described above, with respect to FTR/OFR selector 220, wireless station 105 may calculate outage capacities associated with the FTR mode and the OFR mode. For example, wireless station 105 may determine a mean SNR from channel quality feedback 805 to determine which of an FTR mode or an OFR mode would maximize outage capacity. For example, as illustrated in FIG. 8, wireless station 105 may calculate a mode to maximize outage capacity 810 based on channel quality feedback 805.

The OFR mode or the FTR mode that maximizes outage capacity may be selected (block 715). Wireless station 105 may select the mode of operation for repeater 110 and UE 115 that maximizes outage capacity based on the calculated outage capacities associated with the FTR mode and the OFR mode.

The FTR/OFR mode signal that indicates the selected mode may be transmitted to the repeater and the UE (block 720). For example, as illustrated in FIG. 8, wireless station 105 may transmit an FTR/OFR mode signal 815 to repeater 110 and UE 115. FTR/OFR mode signal 815 may indicate an FTR mode or an OFR mode of operation. Additionally, as previously described, FTR/OFR mode signal 815 may include other types of communication-related decisions (e.g., which frequency band(s) to utilize, power levels, selection of intermediate devices, etc.).

Information to the UE via the repeater may be transmitted, where the UE and the repeater are operating according to the FTR/OFR mode signal (block 725). For example, as illustrated in FIG. 8, wireless station 105 may transmit information 820 (e.g., data) to UE 115 via repeater 110. Repeater 110 and UE 115 will be operating in accordance with the FTR/OFR mode signal 815. In this regard, repeater 110 and UE 115 will be operating in the FTR mode or the OFR mode.

Although FIG. 7 illustrates an exemplary process 700, in other implementations, fewer, additional, and/or different operations may be performed. For example, as previously described, process 700 may include wireless station 105 determining power levels for itself, repeater 110 (e.g., to adjust the aggregate transmit power sharing), and/or UE 115, determining which repeater to utilize when multiple repeaters are available, determining which frequency band(s) to utilize for frequency translated signal(s) in the FTR mode, and/or determining which frequency band(s) to utilize when in OFR mode. Wireless station 105 may make these determinations based on, for example, maximizing the outage capacity. Other variations to process 700 may be contemplated. For example, wireless station 105 may measure and calculate channel quality feedback information. Additionally, or alternatively, repeater 110 or some other wireless station may transmit the FTR/OFR mode signal. It will be appreciated that wireless station 105 may maximize outage capacity based on the adaptive switching between OFR and FTR modes according to various triggering events (e.g., continuous monitoring, periodic time periods, transmission/reception events, etc.).

Another exemplary process is described below, in connection with FIG. 9, in which outage capacity is maximized. For purposes of discussion, the exemplary process will be described based on communication system 100 depicted in FIG. 1B. However, it will be appreciated that the exemplary process may be performed in communication system 100 depicted in FIG. 1A, in which devices different than those depicted in FIG. 1B may be present.

Figure 9:
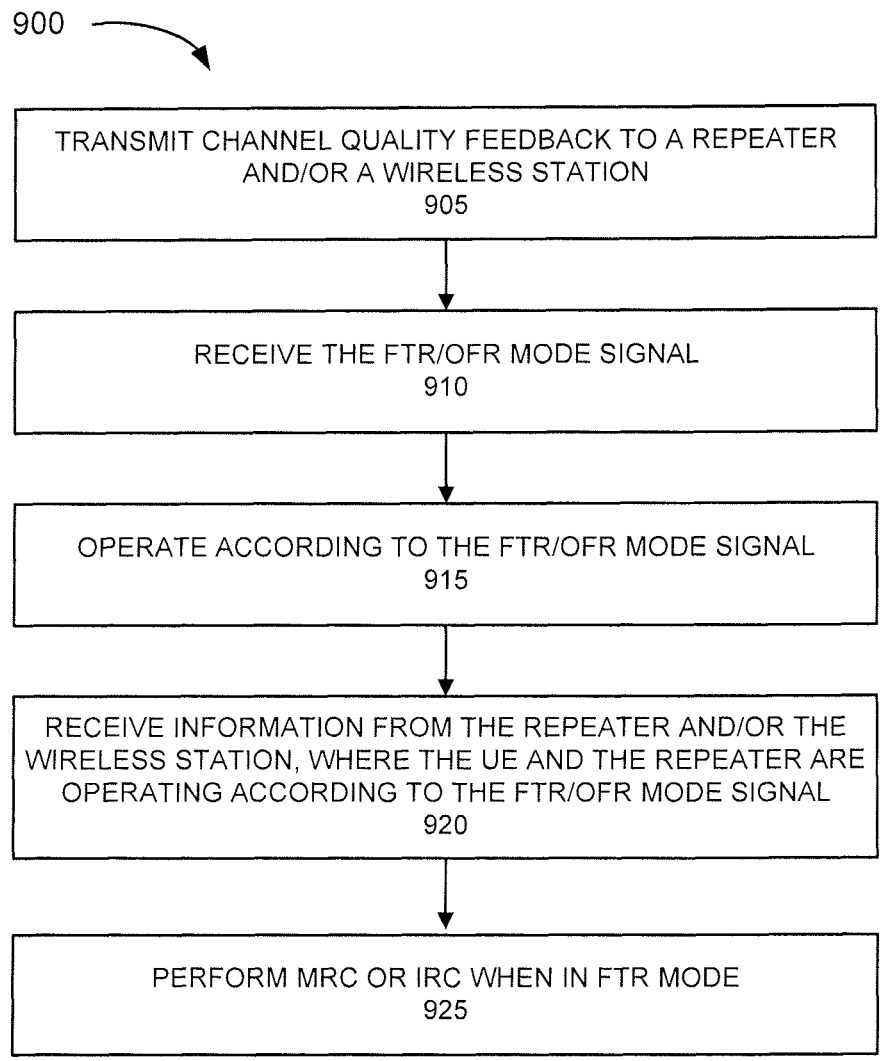
FIG. 9 is a diagram illustrating an exemplary process for maximizing outage capacity.

FIG. 9 is a flow diagram illustrating an exemplary process 900 for maximizing outage capacity. The exemplary process 900 may be performed by UE 115. It will be appreciated that although process 900 is being described as being performed by UE 115, in other implementations, process 900 may be performed by another device in environment 100, such as, for example, wireless station 105. Additionally, while process 900 will be described in reference to the downlink, process 900 may be applicable to the uplink or both the downlink and the uplink. In this regard, depending on the selected implementation, UE 115 and/or wireless station 105 may include the functional components FTR/OFR selector 220 and/or FTR/OFR switcher 630.

It will be In addition to FIG. 9, process 900 will be described in connection with previous figures, as well as FIGS. 10A and 10B. FIGS. 10A and 10B are diagrams illustrating exemplary scenarios that are consistent with process 900. For purposes of illustration, frequency bands have been illustrated as frequency bands (F1) and (F2) in FIGS. 10A and 10B.

Process 900 may begin with transmitting channel quality information to a repeater or a wireless station (block 905). UE 115 may transmit channel quality information 805 to repeater 110 and/or wireless station 105 based on a previous communication. Channel quality feedback 805 may include, for example, statistical measurements of the channel or other types of data indicative of the channel characteristics. The statistical measurements may include, for example, mean gain, mean gain-to-noise ratio, mean SNR, mean signal-to-interference-to-noise ratio (SINR), as previously described. Other types of data indicative of the channel characteristics may include, for example, higher order channel statistics (e.g., variance of the SNR, variance of the SINR, etc.). Additionally, or alternatively, wireless station 105 may measure and calculate channel quality feedback information.

The FTR/OFR mode signal may be received (block 905). For example, UE 115 may receive FTR/OFR mode signal 815, as illustrated in FIG. 8.

The UE may operate according to the FTR/OFR mode signal (block 915). As previously described, FTR/OFR mode signal 815 will include the mode in which UE 115 and repeater 110 is to operate. Additionally, FTR/OFR mode signal 815 may include other communication related information (e.g., power-related, frequency-related, etc.) that may impact how UE 115 and repeater 110 operates.

Information from the repeater and/or the wireless station may be received, where the UE and the repeater are operating according to the FTR/OFR mode signal. For example, as illustrated in FIG. 8, wireless station 105 may transmit information 820 (e.g., data) to UE 115 via repeater 110. Repeater 110 and UE 115 will be operating in accordance with the FTR/OFR mode signal 815. In this regard, repeater 110 and UE 115 will be operating in the FTR mode or the OFR mode.

Figure 10:
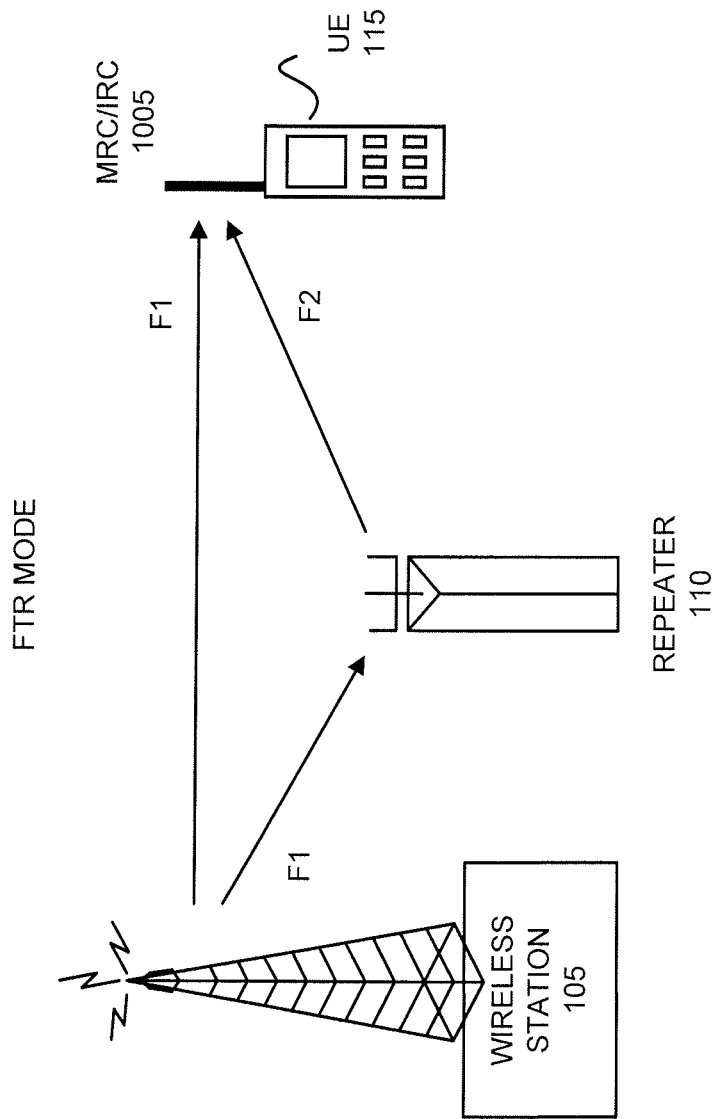
FIG. 10 is a diagram illustrating an exemplary scenario that is consistent with the exemplary process depicted in FIG. 9.

Perform MRC or IRC when in FTR mode (block 925). For example, as illustrated in FIG. 10, depending on the mode of operation, UE 115 may perform MRC or IRC. As illustrated in FIG. 10, when in the FTR mode, wireless station 105 may transmit on a frequency band (F1) to both repeater 110 and UE 115. However, repeater 110, when in FTR mode, shall translate frequency band (F1) to frequency band (F2) before forwarding to UE 115. In this instance, UE 115 may receive information on frequency bands (F1) and (F2). UE 115 may perform MRC/IRC 1005 (e.g., maximum ratio combining (MRC) or interference rejection combining (IRC)) in order to maximize the outage capacity according to the selected mode of operation. The result of MRC/IRC 1005 may be further processed by UE 115.

Although FIG. 9 illustrates an exemplary process 900, in other implementations, fewer, additional, and/or different operations may be performed. It will also be appreciated that blocks 905 through 920 represents a process that may be performed by repeater 110.

The foregoing description of implementations provides illustration, but is not intended to be exhaustive or to limit the implementations to the precise form disclosed. Modifications and variations are possible in light of the above teachings or may be acquired from practice of the teachings. For example, the adaptive switching between OFR and FTR modes may be based on, in addition to maximizing outage capacity or instead of maximizing outage capacity, other robustness-related performance measures (e.g., diversity order (maximization), bit error (minimization) rate, etc.).

In addition, while series of blocks have been described with regard to the processes illustrated in FIGS. 7 and 9, the order of the blocks may be modified in other implementations. Further, non-dependent blocks may be performed in parallel. Further one or more blocks may be omitted. It will be appreciated that one or more of the processes and/or operations described herein may be implemented as a computer program. The computer program may be stored on a computer-readable medium or represented in some other type of medium (e.g., a transmission medium).

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises" or "comprising" when used in the specification is taken to specify the presence of stated features, integers, steps, or components but does not preclude the presence or addition of one or more other features, integers, steps, components, or groups thereof.

No element, act, or instruction used in the present application should be construed as critical or essential to the implementations described herein unless explicitly described as such.

The term "may" is used throughout this application and is intended to be interpreted, for example, as "having the potential to," configured to," or "capable of," and not in a mandatory sense (e.g., as "must"). The terms "a" and "an" are intended to be interpreted to include, for example, one or more items. Where only one item is intended, the term "one" or similar language is used. Further, the phrase "based on" is intended to be interpreted to mean, for example, "based, at least in part, on," unless explicitly stated otherwise. The term "and/or" is intended to be interpreted to include any and all combinations of one or more of the associated list items.

What is claimed is:

1. A method performed by a first device in a wireless network, wherein the wireless network comprises the first device, a second device, and an intermediate device, wherein the second device and the intermediate device are configured to operate in either an on-frequency mode of operation or a frequency translated mode of operation, and wherein the method comprises:
   receiving channel quality feedback information, based on transmitted channel estimation symbols, from at least one of the second device and the intermediate device;
   calculating, based on the channel quality feedback information, an outage capacity associated with the on-frequency mode of operation and an outage capacity associated with the frequency translated mode of operation;
   selecting, based on the calculated outage capacities associated with the on-frequency and frequency translated modes of operation, the mode of operation that maximizes outage capacity; and
   transmitting a message to the second device and the intermediate device indicating that the devices are to operate in the selected mode of operation.

2. The method of claim 1, where the first device comprises a base station, the intermediate device comprises a repeater, and the second device comprises a user terminal, and wherein the method is performed for at least one of a downlink direction, an uplink direction, or both downlink and uplink directions.

3. The method of claim 1, where the first device comprises a user terminal, the intermediate device comprises a repeater, and the second device comprises a base station, and wherein the method is performed for at least one of a downlink direction, an uplink direction, or both downlink and uplink directions.

4. The method of claim 1, where said calculating comprises:
   determining one or more of a mean signal-to-noise ratio, SNR, a mean gain, a mean gain-to-noise ratio, or a mean signal-to-interference-to-noise ratio, SINR, associated with the on-frequency mode of operation and the frequency translated mode of operation; and
   calculating the outage capacity associated with the on-frequency mode of operation and the outage capacity associated with the frequency translated mode of operation based on the one or more of the mean SNR, the mean gain, the mean gain-to-noise ratio, and the mean SINR.

5. The method of claim 4, where said determining comprises determining one or more the mean SNR, the mean gain, the mean gain-to-noise ratio, or the mean SINR associated with frequency bands corresponding to the on-frequency mode of operation and the frequency translated mode of operation.

6. The method of claim 1, where the intermediate device comprises a plurality of repeaters, and wherein the method further comprises selecting at least one of the plurality of repeaters to utilize based on a criterion to maximize outage capacity.

7. The method of claim 1, further comprising, when the frequency translated mode of operation is selected, selecting one or more frequency bands to utilize based on a criterion to maximize outage capacity.

8. The method of claim 1, further comprising selecting a power level, for transmitting information to the second device and the intermediate device, that maximizes outage capacity according to the selected on-frequency or frequency translated mode of operation.

9. The method of claim 1, wherein the message includes a power level at which the second device and the intermediate device are to operate.

10. A first device in a wireless network, wherein the wireless network comprises the first device, a second device, and an intermediate device, wherein the second device and the intermediate device are configured to operate in either an on-frequency mode of operation or a frequency translated mode of operation, and wherein the first device comprises:
    one or more antennas; and
    a processing system configured to:
       receive channel quality information, based on transmitted channel estimation symbols, from at least one of the second device and the intermediate device;
       calculate, based on the channel quality feedback information, an outage capacity associated with the on-frequency mode of operation and an outage capacity associated with the frequency translated mode of operation;
       select, based on the calculated outage capacities associated with the on-frequency and frequency translated modes of operation, the mode of operation that maximizes outage capacity; and
       transmit a message to the second device and the intermediate device indicating that the devices are to operate in the selected mode of operation.

11. The first device of claim 10, where the channel quality information includes one or more of a mean signal-to-noise ratio, SNR, a mean gain, a mean gain-to-noise ratio, or a mean signal-to-interference-to-noise ratio, SINR, associated with frequency bands corresponding to the on-frequency mode of operation and the frequency translated mode of operation.

12. The first device of claim 10, where the processing system is further configured to calculate an outage capacity associated with the on-frequency mode of operation and an outage capacity associated with the frequency translated mode of operation based on the one or more mean signal-to-noise ratio, SNR, mean gain, mean gain-to-noise ratio, or mean signal-to-interference-to-noise ratio, SINR.

13. The first device of claim 10, wherein the first device includes a base station or a user terminal.

14. The first device of claim 10, where the processing system is further configured to select one or more frequency bands associated with the on-frequency mode of operation or the frequency translated mode of operation that maximizes the outage capacity.

15. The first device of claim 10, wherein the processing system is configured to determine the channel quality information by receiving the channel quality information, based on transmitted channel estimation symbols, from at least one of the second device and the intermediate device, and to select the mode of operation by:
    calculating, based on the channel quality information, an outage capacity associated with the on-frequency mode of operation and an outage capacity associated with the frequency translated mode of operation; and
    selecting, based on the calculated outage capacities associated with the on-frequency and frequency translated modes of operation, the mode of operation that maximizes outage capacity.

16. A computer program product stored on non-transitory computer-readable medium and comprising instructions that, when executed by a processor associated with a first device, cause the first device to:
    receive channel quality information, based on transmitted channel estimation symbols, from at least one of a second device and an intermediate device;
    calculate, based on the channel quality information, an outage capacity associated with an on-frequency mode of operation and an outage capacity associated with a frequency translated mode of operation;
    determine, based on the calculated outage capacities, which of the on-frequency mode of operation and the frequency translated mode of operation maximizes outage capacity; and
    transmit a message to the second device and the intermediate device indicating that the devices are to operate in the determined mode of operation.

17. The computer program product of claim 16, wherein the instructions further cause the first device to transmit a signal indicating which of the modes of operation maximizes outage capacity.

18. The computer program product of claim 16, wherein the instructions further cause the first device to calculate, based on the channel quality information, one or more mean signal-to-noise ratios, SNRs, associated with one or more frequency bands associated with the on-frequency mode of operation and the frequency translated mode of operation.

19. The computer program product of claim 16, wherein the first device comprises a base station in a wireless communication system.

20. The computer program product of claim 16, wherein the first device, a second device, and an intermediate device are comprised in a wireless network, wherein the second device and the intermediate device are configured to operate in either the on-frequency mode of operation or the frequency translated mode of operation, and wherein the instructions cause the first device to receive channel quality information, based on transmitted channel estimation symbols, from at least one of the second device and the intermediate device, and to transmit a message to the second device and the intermediate device indicating that the devices are to operate in the mode of operation determined to maximize outage capacity.

* * * * *

UNITED STATES PATENT AND TRADEMARK OFFICE
CERTIFICATE OF CORRECTION

PATENT NO. : 8,472,367 B2
APPLICATION NO. : 13/128806
DATED : June 25, 2013
INVENTOR(S) : Larsson et al.

Page 1 of 1

It is certified that error appears in the above-identified patent and that said Letters Patent is hereby corrected as shown below:

On the Title Page, Item (56), under "OTHER PUBLICATIONS", in Column 2,
Line 1, delete ""Perfomance Anlaysis of" and insert -- "Performance Analysis of --, therefor.

In the Specification

In Column 8, Line 30, delete "FRT/OFR" and insert -- FTR/OFR --, therefor.

In Column 8, Line 32, delete "UE 205" and insert -- UE 115 --, therefor.

In Column 9, Line 48, delete "FRT/OFR" and insert -- FTR/OFR --, therefor.

In Column 11, Line 56, delete "be In addition" and insert -- be in addition --, therefor.

Signed and Sealed this
Fifth Day of November, 2013

Teresa Stanek Rea
*Deputy Director of the United States Patent and Trademark Office*